United States Patent

[11] 3,579,192

[72] Inventors David Rasche
Bloomfield Hills, Mich.;
Bernardo N. Levy, Livingston, N.J.; Bruce L. Ayres, Southfield; Hoy Ying Chang, Westland; Cornelius C. Perkins; William W. Phillips, Birmingham, Mich.

[21] Appl. No. 680,184
[22] Filed Nov. 2, 1967
[45] Patented May 18, 1971
[73] Assignee Burroughs Corporation
Detroit, Mich.

[54] DATA PROCESSING MACHINE
23 Claims, 15 Drawing Figs.

[52] U.S. Cl. 340/172.5
[51] Int. Cl. G06f 9/16
[50] Field of Search 340/172.5; 235/157

[56] References Cited

UNITED STATES PATENTS

| | | | |
|---|---|---|---|
| 3,478,322 | 11/1969 | Evans | 340/172.5 |
| 3,315,235 | 4/1967 | Carnevale et al. | 340/172.5 |
| 3,377,619 | 4/1968 | Marsh et al. | 340/172.5 |
| 3,404,378 | 10/1968 | Threadgold et al. | 340/172.5 |

*Primary Examiner*—Raulfe B. Zache
*Attorneys*—Kenneth L. Miller, Wallace P. Lamb, Edwin W. Uren and Paul W. Fish

ABSTRACT: An improved digital computer having a limited number of hardware elements which can be used to perform varied logical processes on data under the control of macroinstructions, each macroinstruction being implemented through a series of stored microinstructions forming a stored microprogram, each microinstruction corresponding to a control signal for actuating a hardware element in the computer, a series of said microinstructions being used to implement the hardware elements in varied sequences in order to perform different logical processes.

INVENTORS

CORNELIUS C. PERKINS
BERNARDO N. LEVY
BRUCE L. AYRES
HOY YING CHANG
DAVID RASCHE
WILLIAM W. PHILLIPS

INVENTOR.

INVENTOR.

INVENTOR.

INVENTOR.

INVENTOR.

DATA PROCESSING MACHINE

SUMMARY OF THE INVENTION

This invention relates to data processing machines, and more particularly, to computers having internal programming and stored logic.

Many small businesses still utilize mechanical computers and calculators rather than the newer electronic data processing equipment. This is so because these businesses do not have a large enough volume of work to justify the use of the expensive electronic computers. Mechanical computers are cheaper than electronic computers, but are slower and not as versatile. Also, because of the large number of moving parts used by such mechanical computers, they are frequently less reliable and have a higher cost for maintenance.

Present day electronic computers operate very rapidly and efficiently; however, they are extremely expensive. Many small businesses do not have enough work to fully utilize the available time of an electronic computer and are reluctant to pay the high price for such computers. For example, the billing and accounting operations of a small business are frequently not sufficient to fully utilize a computer.

It is known that many hardware components of electronic computers can be replaced by software. With this mechanization the computer follows a "software" program to perform a series of steps, using generalized hardware components, which duplicate the function of a more specialized hardware component for performing the same function. In this way, several different software programs can utilize the same hardware components and result in data processing equipment that is much simpler.

Two techniques for replacing hardware with software are microprogramming and the use of stored logic. These techniques sometimes slow down the operation of a computer but enable it to perform with fewer hardware components. Since many business applications do not require high speeds, these techniques can be used advantageously in a keyboard-driven controlled computer for business applications. Such a computer can be manufactured with very few hardware parts and still be able to satisfy the needs of many small businesses for operations such as billing. A machine designed in this way is very inexpensive and reliable because of the small number of hardware components. Such a machine is also versatile since its function can be changed by merely changing the stored microprogram.

A microprogrammed computer is a computer in which a series of microinstructions implement the ordinary instruction called a macroinstruction utilized by other computers. For example, in another form of computer the instruction ADD involves a series of steps, controlled by wiring in response to one instruction, that causes the augend and addend to be transferred from the memory to the adder, the sign and overflow conditions to be checked, and the sum to be taken from the adder and reinserted into the computer memory.

In a microprogrammed machine, the macroinstruction ADD causes the microprogram to be sequenced through a program register or a control register as a series of microinstructions, each of which performs one operation with the gating circuitry of the computer. This series of individual microinstructions causes the information to be read out of storage and added, and the sum to be replaced in storage just as the single instruction in other computers. However, fewer hardware components are needed because the same hardware components can be used to perform many other macroprograms merely through the use of different microprograms for each macroinstruction.

The use of stored logic in a computer also saves hardware. Stored logic may take the form of registers, flip-flops and counters that exist in the magnetic storage area of the memory as a series of magnetized spots rather than existing as a hardware component that includes flip-flops having transistors or vacuum tubes or other discrete components. Incrementing such counters or registers usually involves an arithmetic operation under the control of a microprogram.

Accordingly, it is an object of this invention to provide an improved computer.

It is a further object of this invention to provide a reliable, inexpensive, and versatile computer through the increased use of software.

It is a further object of this invention to provide a small electronic computer especially adapted to the needs of small business through the use of microprogramming and stored logic techniques.

In accordance with the above objects, a computer is provided having a main memory, a data manipulation section, a microprogram control section, and an input-output section. The input-output section includes a keyboard and a printer. However, the machine may be adapted to operate in connection with punched card readers, tape readers, card punches, magnetic tape apparatus, and other similar input-output equipment.

The main memory of the computer is contained on a rotatable magnetic disc which is divided into macrostorage tracks, microstorage tracks, data tracks and functional tracks. In the operation of the computer there is normally a strict demarcation between the macro and micro storage tracks, however, in exceptional cases the microstorage area of the present invention can be made to spill over into the macrostorage area.

The functional portion of the main memory is divided into several tracks each performing different functions. The functional tracks are located on the peripheral portion of the disc, however, they could just as well be placed near the axis of the disc. The functional tracks provide the timing pulses necessary for the operation of the computer and, in one embodiment of the computer, cooperate with a pair of recirculation loops which are used with the data manipulation section of the computer in the processing of data. The latter loops include a recirculation loop on the magnetic disc for synchronizing read and write operations, and a recirculation loop for storing data that is being processed and for storing various registers and buffers needed in the processing of the data.

The data manipulation section of the computer includes a serial adder, a hardware buffer register and temporary storage areas. The temporary storage areas can be either the previously mentioned recirculation loops forming a part of the main memory or metallic oxide semiconductor registers. The latter type registers can be employed in applications requiring more storage area on the disc and where greater data processing power and flexibility are desired.

The microprogram control section includes a control register (microinstruction register), a timing matrix, and a control matrix, all of which operate in conjunction with the microinstruction tracks on the magnetic disc. The active microtrack (the selected track of microinstruction storage) holds the microinstructions that are currently necessary to execute a macroinstruction or part of a macroinstruction. In some cases the microinstructions making up the active microtrack may be repeated in several different locations on the track to provide faster accessibility to a single read head. The microinstructions in the active microtrack are read into the microinstruction register which in turns provides outputs to the control matrix which establish the proper voltage levels to open the gates necessary to execute the microinstruction. The microinstruction register also provides output signals to the timing matrix which in turn provide output signals to the gates at the proper time under the control of synchronizing clock pulses derived from timing tracks on the magnetic disc. The microinstruction register in combination with the control matrix and timing matrix provide for sequencing of the simple machine state control.

BRIEF DESCRIPTION OF THE DRAWINGS

The invention and the afore-noted and other features thereof will be understood more fully and completely from the following detailed description considered with reference to the accompanying drawings in which.

DETAILED DESCRIPTION OF THE INVENTION

Figure 1:
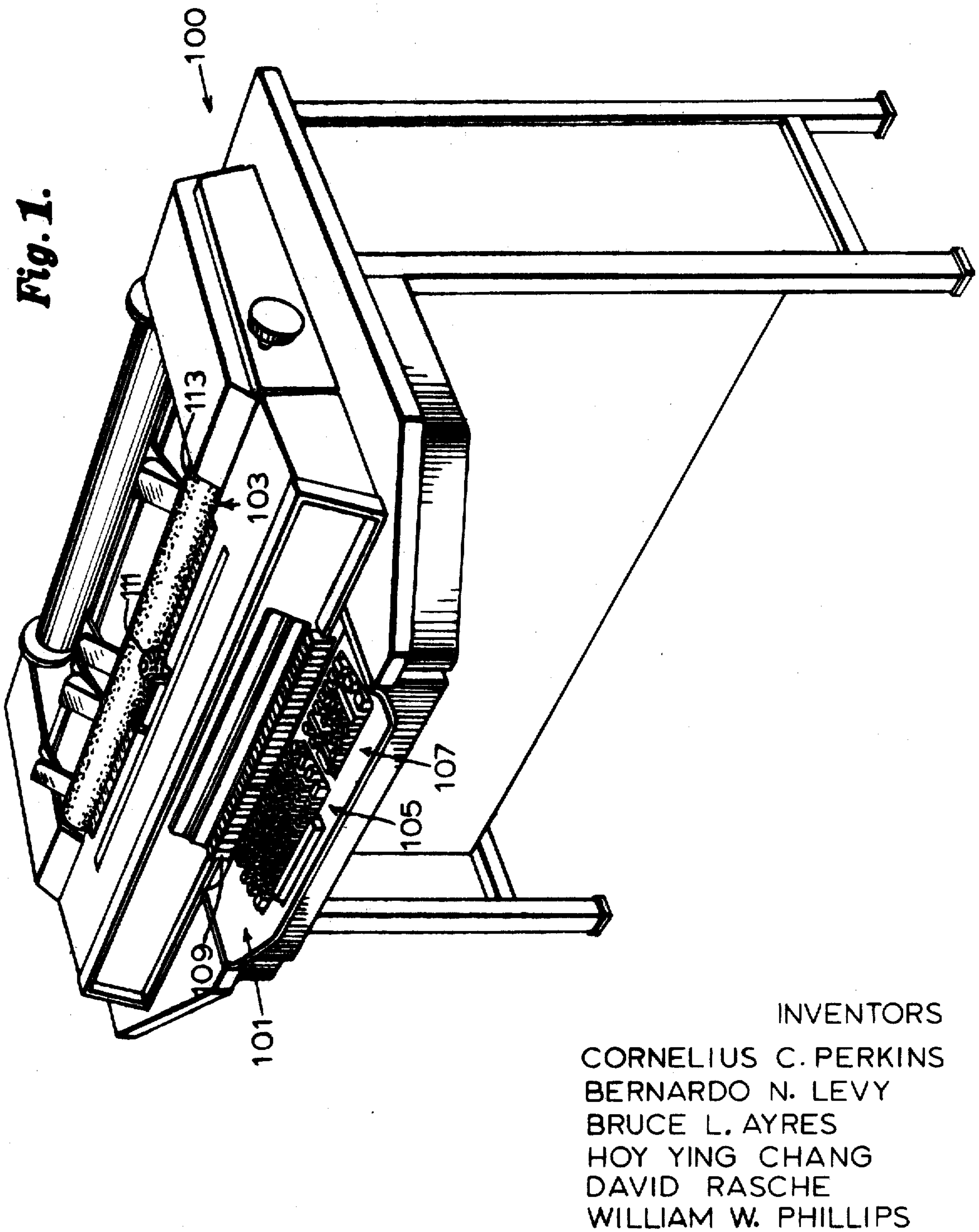
FIG. 1 is a perspective drawing of the main frame of a computer according to an embodiment of this invention.

In FIG. 1 a perspective drawing of a desk computer according to an embodiment of the invention is shown and indicated generally by 100. The computer has an alphanumeric keyboard 101 and a printer 103. The keyboard 101 has an alphabetic section 105, on the left, a numeric section 107, on the right, and a control section 109. The printer 103 includes a single element-type head 111 adapted to move parallel to the platen 113.

It is contemplated that this desk computer may be used in many data processing operations utilized by small businesses such as a billing operation. In the operation of this computer, the operator may select the program for billing by pushing the appropriate key in the section of the keyboard 109. He then may type into the alphabetic section 105 and numeric sections 107 of the keyboard, the external data such as the identification number of the customer and the part numbers of purchased items.

As the identification number of the customer is typed into the keyboard 101, the computer can withdraw from its memory the necessary information concerning the customer so that the printing element 111 types the customer's name and identification number together will all other necessary identifications on the billing form that is placed in the printer 103. The operator may then type a part number and a quantity representing an individual purchase. The desk computer under the control of the selected program then withdraws from its memory the necessary information concerning the item represented by the part number, types this information on the form in the appropriate places, and calculates incidental matters such as the sales tax on the item and the total cost of the specific quantity of the item.

The operator may continue in this manner providing only the first identification of persons or items by way of the keyboard 101 while the computer supplies all of the information which can be stored in its memory and automatically performs all of the calculations required by the program selected by the operator. Some of the keys on the section of the keyboard 109 can be set aside for programming options to handle exceptional items which require a different processing routine that that provided by the basic or usual machine program.

Figure 2:
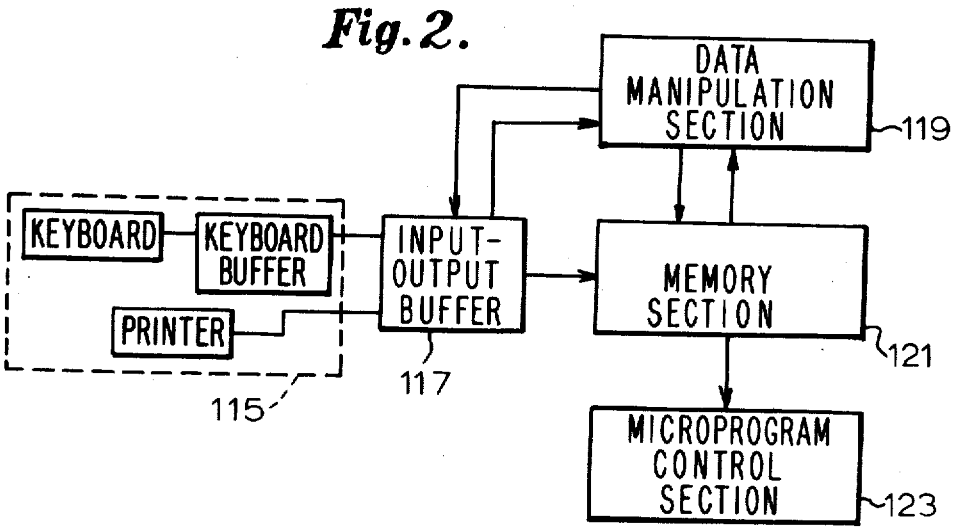
FIG. 2 is a block diagram of the main sections of the computer shown in FIG. 1.

In FIG. 2 a block diagram of the various sections of the computer is shown having a keyboard and printer unit 115, an input-output buffer or register 117, a data manipulation section 119, a main memory section 121, and a microprogram control section 123. The keyboard and printer are independent units electrically and mechanically. They are coordinated by microcontrol.

Whenever a key in the keyboard is depressed, a binary code identifying the key is inserted into the keyboard buffer. Microprogramming extracts the code from the keyboard buffer and inserts it into the input-output buffer 117 for further processing. The input-output buffer 117 sends the code to the data manipulation section 119 where it is assembled into words for storage in the main memory section 121.

The input-output buffer is also used to address the main memory for communications to and from the data manipulation section 119. For example, after the data has been assembled into words in the data manipulation section 119, a memory address location is entered into the input-output buffer 117. The data words are then entered into the correct memory location through the input-output buffer 117.

The data manipulation section 119 receives information from the main memory section 121 and may also insert some of this information into the input-output buffer 117, or back section into the main memory section 121. The microprogram control section 123 receives information from the main memory section 121 and can cause information from the data manipulation section 119 to go to the main memory 121.

Figure 3:
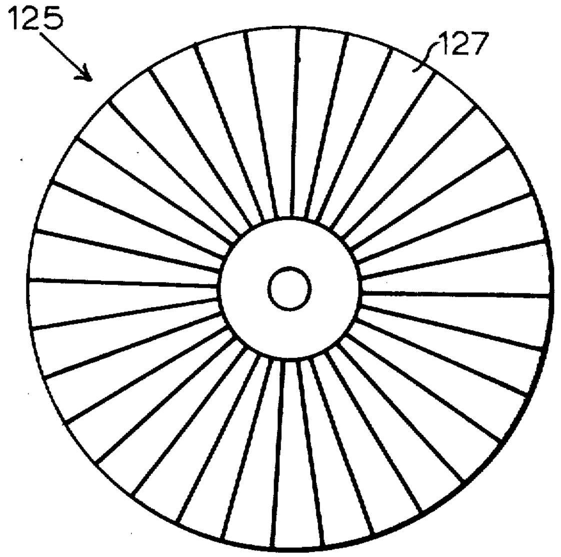
FIG. 3 is a schematic diagram of the disc memory used in the computer of this invention.

In FIG. 3 a diagram of the main memory is shown. The main memory is a single rotatable magnetic disc 125 having 36 tracks. However, not all of these tracks are normally used. The outer track is a clock pulse track and the next track is a sector pulse track. These two tracks provide the timing for the computer. The track area 133 located next to the sector track is used for the two recirculation loops that operate in connection with the data manipulation section. The remainder of the tracks are used for storage of data, macroprograms, and microprograms. Each storage track contains 32 words along its length and each word contains 64 bits. In the embodiment of the computer employing the metallic oxide semiconductor register the disc area occupied by the recirculation loops is available for other applications, for example, buffer and data storage.

Figure 4:
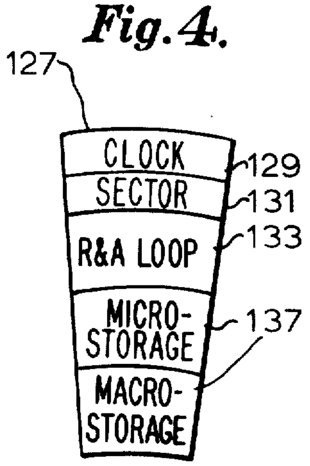
FIG. 4 is a diagram of a section of the disc memory.

In FIG. 4 a sector 127 of the disc 125 is shown indicating the respective positions of the clock track 129, the sector track 131, the track 133 used for the two recirculation loops, and the tracks 137 used for the main storage. The main storage is divided into micro and macro storage areas. The microstorage portion contains the microinstructions for carrying out all machine operations. The macrostorage area contains the data and macroprogramming instructions which are implemented through the stored microprograms. The macrostorage area can be altered through the input keyboard to adapt the computer to carry out a different logical process on the stored or subsequently entered data.

Figure 5:
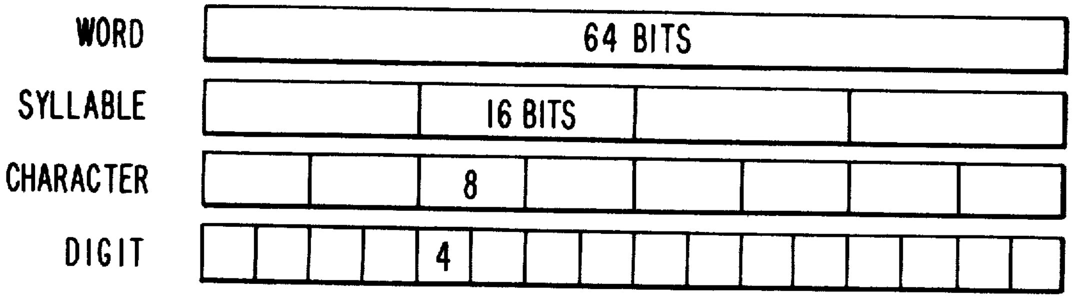
FIG. 5 is a diagram of one word along a track of the memory.

In FIG. 5 a diagram is shown indicating the format for each of the 32 words in one of the tracks. Each word contains 64 bits which are divided into four 16-bit syllables. Each syllable is divided into two 8-bit characters and each character is divided into two 4-bit digits.

Figure 6:
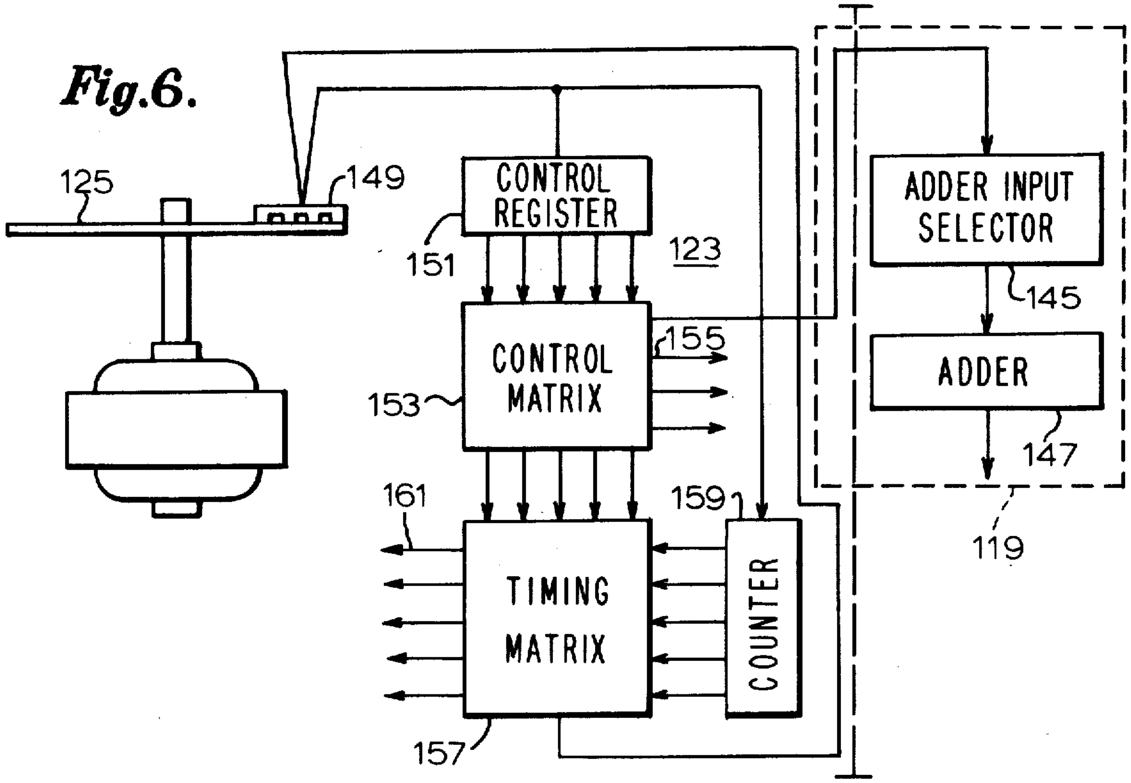
FIG. 6 is a block diagram showing the relationship between the microprogram control section, the main memory, and the data manipulation section.

In FIG. 6 a block diagram is shown indicating the manner in which the microprogram control section 123 is connected to the magnetic disc 125 and to the data manipulation section 119, which latter section includes the adder input selector 145 and the adder 147. A package of magnetic read heads 149 receives the signals from the various tracks of the magnetic disc 125.

One of the heads reads signals from the active microtrack which contains the microinstructions that are to be executed next. This read head is electrically connected to the control register identified at 151. The microinstructions need not be in the same order along the track as they are to be read into the control register 151 for execution since each of the microinstructions contains the address of the next microinstruction that is to be read into the control register. Because of this, the proper execution sequence of microinstructions can be maintained even though they may not be located in a regular sequence along the active microtrack.

Figure 9:
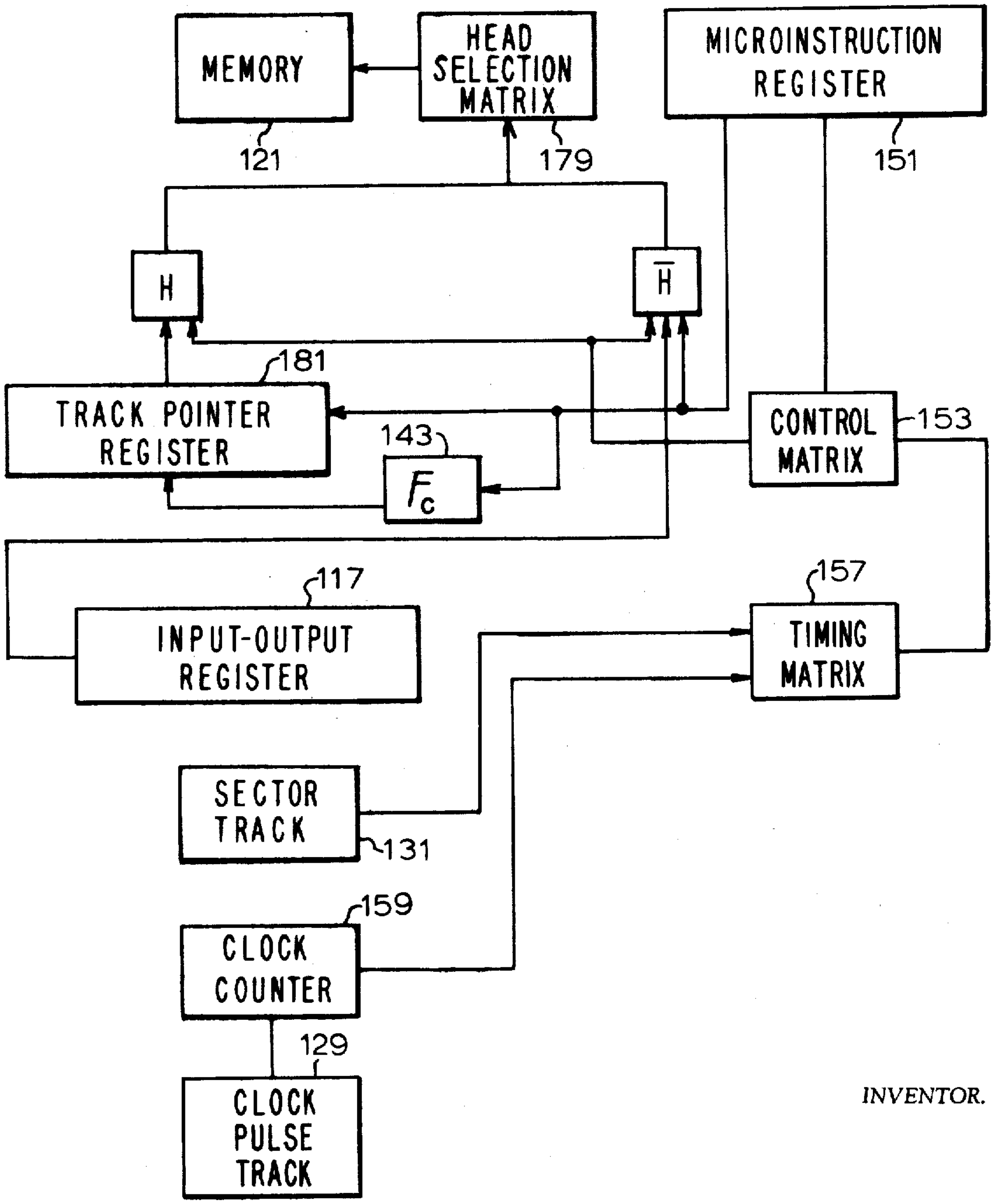
FIG. 9 is a block diagram illustrating the manner in which access is obtained to the main memory.

Some of the microinstructions are recorded several times in the microinstruction tracks so that they appear under the read head in a shorter period of time after they are addressed by the address portion of the microinstruction in the control register 151. The last microinstruction contains the address of the next microtrack containing the microinstruction to be executed. The track that includes this next microinstruction is selected by the track pointer register 181 (FIG. 9).

The control matrix 153 receives signals in parallel from the control register 151, which has the microinstruction that is to be executed. The control matrix provides two value voltage levels to its output lines 155 which serve to provide two logic levels for decoding the microinstruction in the control register. These output lines each provide an appropriate input to one of the gates that control the data manipulation section 119 of the computer. Signals from the control register 151 are also applied to the timing matrix 157. The timing matrix 157 also receives inputs from a counter 159. The combination of the inputs from the control register 151 and the inputs from the counter 159 causes outputs to be generated on the output lines 161 of the timing matrix 157. The counter 159 receives pulses from the clock and sector tracks of the magnetic disc 125, which pulses synchronize the outputs on the lines 161 with the rotation of the disc 125.

The control matrix 153 and the timing matrix 157 are not shown in detail but are designed in accordance with any of the well-known techniques, such as the one described in "Digital Computer Components a:id Circuits" by R. K. Richards, Van Nostrand Company Incorporated, on pages 56—60. The outputs from these matrices select the gates which are to form interconnections between the various units of the computer in accordance with the code from the microinstruction that is stored in the control register 151.

Figure 7:
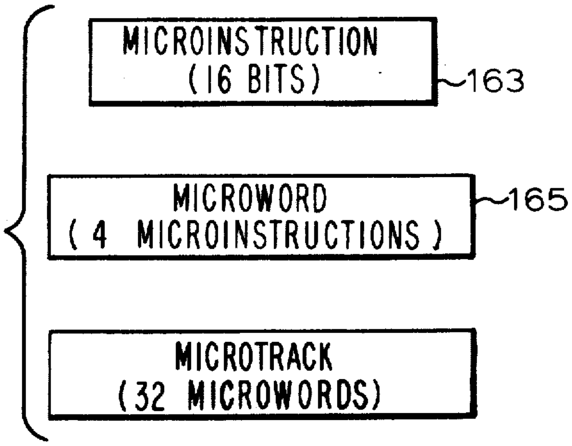
FIG. 7 is a diagram showing the format of the microprograms.

In FIG. 7 the format for the microprograms is shown. The computer of the illustrated embodiment employs hexadecimal machine language so each microinstruction 163 has 16 bits. Each of the microinstructions contains within these 16 bits the address of the next microinstruction to be executed. Each microword 165 contains four microinstructions. Each microstorage track on the disc contains 32 microwords and is called a microtrack. The microinstructions making up a microword are not necessarily located next to each other, but are read in time sequence.

Figure 8:
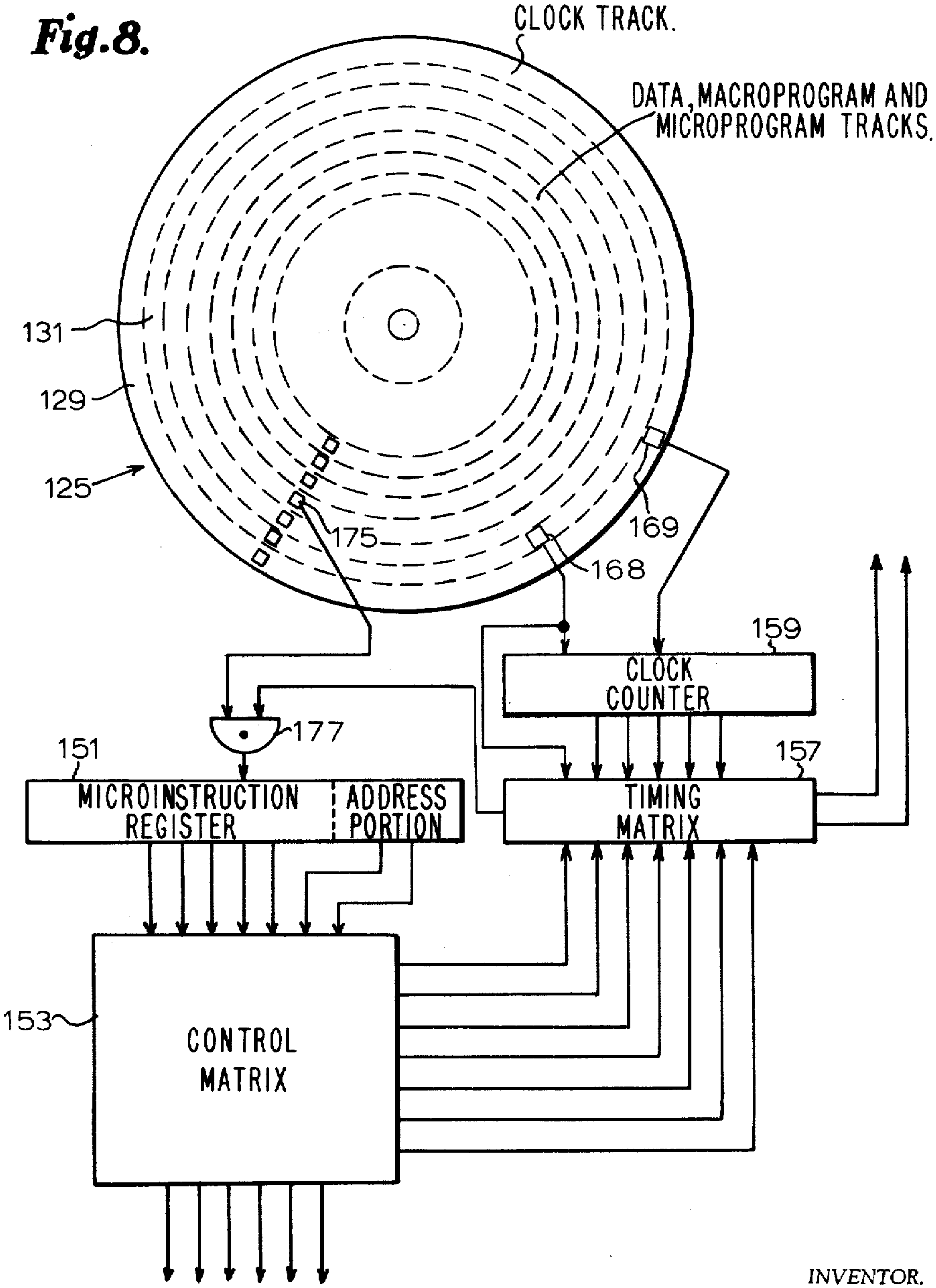
FIG. 8 is a block diagram showing the manner in which the microprogram control section sequences microprograms located on the magnetic disc.

In FIG. 8 a block diagram is shown of the microprogram control section having the control register 151 (microinstruction register), the control matrix 153, the timing matrix 157, the clock counter 159, and the magnetic disc 125. The magnetic disc has the timing track 129 that provides the pulse at every bit time and the sector track 131 which provides address information for each of the sectors on the disc. The pulses generated by the sector track 131 on the magnetic disc are picked up by read head 168 and sent to the clock counter 159 and to the timing matrix 157. The pulses generated by the timing track 129 are picked up by read head 169 and sent to the clock counter 159. The timing track 129 increments the counter 159. The sector track acts as a counter extension increasing the count from $2^3$ to $2^{11}$ bits. The counter 159, in combination with the sector track, provide information to locate each point on the disc.

The microinstructions are read from a selected microtrack on the magnetic disc into the microinstruction register 151 under the control of the timing matrix 157. The timing matrix 157 enables the AND gate 177 when the selected head 175 is above the first bit of the microinstruction that has last been addressed. Each microinstruction addresses the microinstruction that is to follow it. If the next microinstruction has been placed within the next 16 instructions on the same track as the microinstruction that is in the microinstruction register 151, the four most significant bits (last to be read from the track) of the microinstruction register 151 provide its address to the control matrix 153 which causes the timing matrix 157 to enable the AND gate 177 at the proper time to read a new instruction into the microinstruction register 151. On some microinstructions it cannot be guaranteed that the next instruction can be placed by the programmer within the following 16 instructions from the time of execution of the last instruction, consequently, three more bits of the microinstruction register 151 are used in these microinstructions to address the next instruction on the same track. Any instruction on the same track can be addressed with these four bits. When it is necessary to address an instruction on another track, which will then become designated as the active microtrack, still another four bits of the instruction currently in the microinstruction register 151 may be used in a manner described more fully in connection with FIG. 9. With this mechanization, a continuous sequence of microinstructions can be provided. These instructions can also provide for the address of the following instruction to be selected by information external to the instruction in the microinstruction register in order to provide for jump operations. This will be described in greater detail in connection with FIG. 9.

When the first microinstruction from the active microtrack passes under the read head 175, the timing matrix 157 causes the microinstruction to be read through the AND gate 177 into the microinstruction register 151. This is accomplished as described above through the operation of the control matrix 153 on the last four (or seven) bits of the previous microinstruction in the microprogram register 151 in conjunction with the clock counter 159 and the timing matrix 157.

The microinstruction is executed through the operation of the control matrix, timing matrix, and clock counter to control the appropriate gates in the data manipulation section of the computer. The last address bits of the microinstruction also cause the next microinstruction to be read from the active microtrack into the microinstruction register 151 for execution. In order to save time in the machine operation, the first eight bits of every microinstruction are loaded into the control register 151. If on examination of the ninth bit, it is found that the proper microinstruction is not present, then the first eight bits of the next microinstruction are loaded and so on until the proper microinstruction is located. This process of extracting one of the active microprogram steps and executing it occurs in four major phases:

1. Microinstruction Search. The logic waits until the ninth bit of the selected microinstruction step is ready to appear at the read amplifier of the active microprogram track.
2. Microinstruction Load. The selected microinstruction is read into the control register 151.
3. Operand Search. The contents of the microinstruction register, through the control matrix, is used to select from several alternate timing controls the appropriate timing control for this instruction. The logic then waits until the selected information, as designated by the timing matrix, is available.
4. Execution. The operation is then executed. When the time for the execution is complete, the timing matrix logic returns to Phase 1 where it waits for the next microinstruction to become available at the read amplifier of the active microtrack.

There are two possible instructions for selecting the active microtrack.

There are two possible instructions for selecting the active microtrack. One instruction selects the active microtrack from an address contained in the prior microinstruction; the other selects the microtrack from an address contained in the input-output buffer 117 of the computer. The latter address may originate from the keyboard, the data manipulation section, or the memory of the computer under program control.

In FIG. 9 a block diagram is shown of the equipment for obtaining access to the main memory 121 through the head selection matrix 179. Three registers are involved in selecting the address for reading or writing information into the memory 121. They are the microinstruction register 151, the track pointer register 181, and the input-output register or buffer 117. Also, the timing matrix 157, the control matrix 153, the clock counter 159 and the timing and sector tracks are used to help keep track of the position of the read and write heads on the magnetic disc that is used in the memory 121.

A special flip-flop (Fc) 143 is provided for use in exceptional cases where it is necessary to expand the microstorage area into the macrostorage area. By means of flip-flop 143 the microstorage area can be expanded to 16 more tracks. Expansion of the microstorage can be provided by setting a flag in programming and is particularly useful in so-called "Jump" operations.

The synchronizing circuit 183 (FIG. 13A) recognizes a unique sequence of 15 pulses of the same polarity which are recorded on the sector track of the magnetic disc to indicate the initial or starting position of the magnetic disc. When the synchronizing circuit 183 recognizes this code at a starting position for a cycle of rotation of the magnetic disc after the machine has been turned on or after an error, it clears the counter that is used to record the position of the read and write heads on the disc. It then counts positions that the disc has moved from the bits recorded on the clock pulse track and the sector track. The sector track recognizes the code for each character on the magnetic disc and the clock pulse counter 159 in combination with the timing track 129 counts once for each bit along the track.

Access to the main memory is accomplished by any one of three methods:

1. A sequence of two or more microinstructions in which all but the last instruction modify the address leaving the result in the input-output register 117. The final microinstruction selects the block of eight tracks involved in the access and uses three of the eight bits of the input-output register to select the track and the remaining five bits to select the word within the track.
2. A similar multiple microinstruction operation in which four bits of the input-output register are transferred to the track pointer register 181 to select the track, and three bits of the microinstruction register 151 and four bits of the input-output register select one of 128 microinstructions in the selected track.
3. A single microinstruction in which the address of a microinstruction is completely determined by eleven bits in the microinstruction. Again, four bits are transferred to the track pointer register to select the active microtrack.

The microprogram instruction register 151 in conjunction with counter 159 enables the gates leading from the selected head in the head selection matrix 179 at the proper time. The track is selected by the track pointer register 181. The input-output register 117 may also contain the address of the next word to be selected instead of the microprogram register 151.

Figure 10:
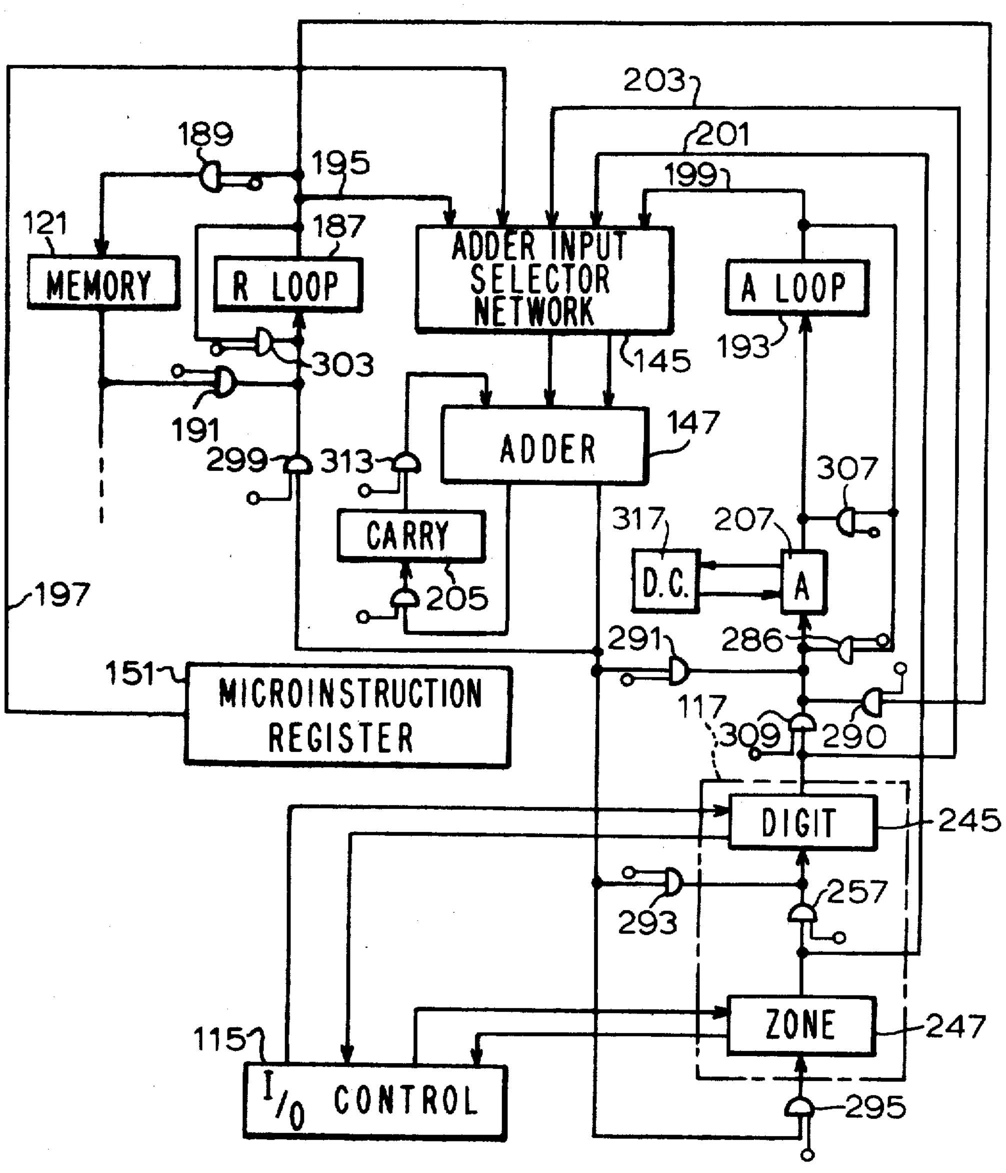
FIG. 10 is a block diagram of the data manipulation section.

In FIG. 10 a block diagram of the data manipulation section of the computer is shown along with its interconnection to the memory 121, the microinstruction register 151, and the input-output control 115. A one-word recirculation loop (the R loop) 187 is connected to the memory 121 through the gate 189 and the gate 191. The R loop is used to synchronize information during the transfer from the data manipulation section to the memory 121 through the gate 189 and for synchronizing the transfer of information from the memory 121 to the data manipulation section through the gate 191. A four-word recirculation loop (the A loop) 193 stores information used in the sequencing of macroinstructions and temporarily stores data for use in the computer.

As adder input-selection network 145 controls the transfer of information to the serial adder-subtractor 147. The adder input-selection network receives information from the R recirculation loop through the conductor 195, from the microinstruction register 151 through the conductor 197, from the four most significant bits of the input-output register 117 (Zone) through the conductor 201, and from the four least significant bits of the input-output register 117 (Digit) through the conductor 203.

A "carry" circuit 205 is used with the adder-subtractor 147. The output from the adder-substractor 147 is connected to the R loop 187. It is also connected to the circuits in series with the A loop: the input to Zone, the input to Digit, and the input to the A register 207 (the A loop register) that is connected between the input-output buffer and the input to the A loop.

The adder-subtractor 147 performs its operation in binary code. Prior to adding, a binary 6 is added to either the augend or addend. By adding the binary 6, as shown as 317 in FIG. 13A, a correction is made for the difference between the carry digit in the binary and decimal systems. Subtraction is, of course, performed by the complementary method. The carry signal is used to indicate whenever a larger number has been subtracted from the smaller number so that the process can be reversed and the proper difference obtained. The carry signal also indicates whenever a 6 must be subtracted from the sum or the difference because a decimal-6 correction is not necessary. The adder is an ordinary series adder for binary numbers with a separate input for subtraction.

Figure 11:
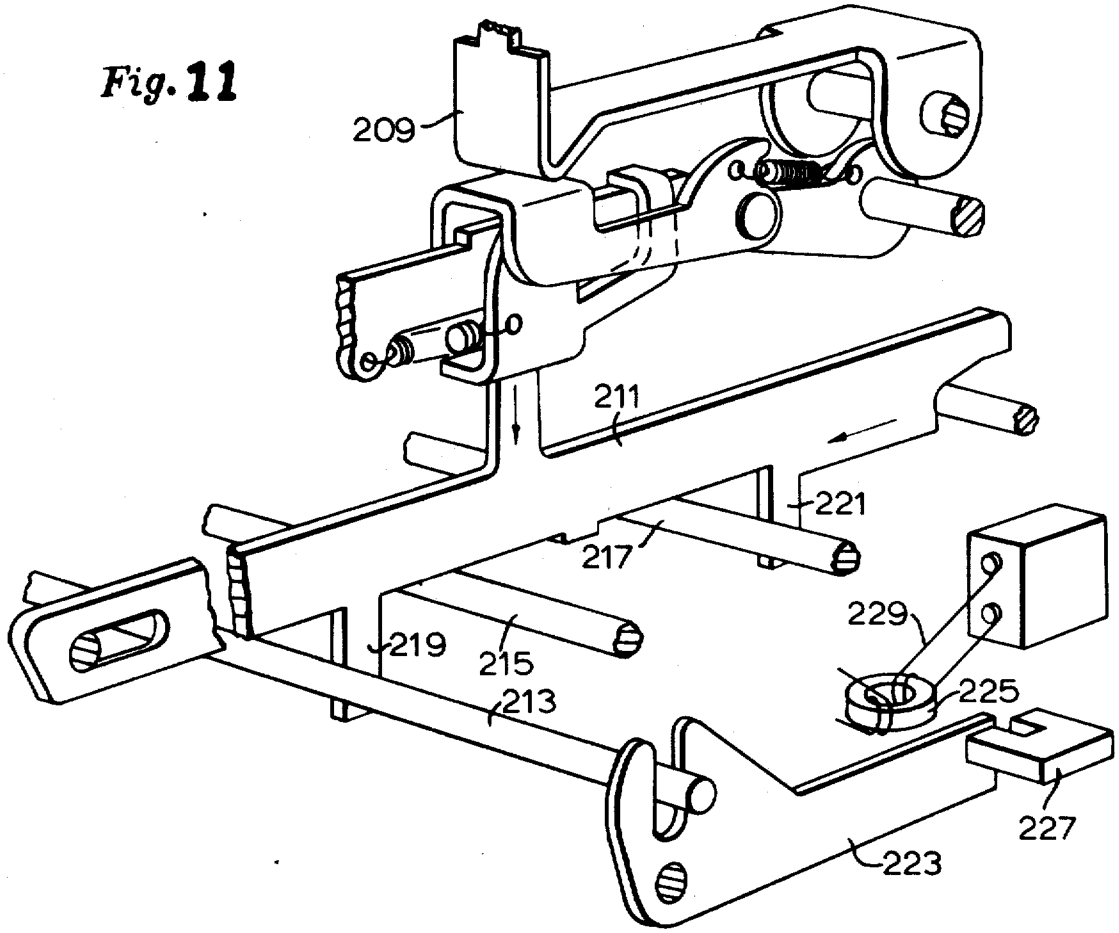
FIG. 11 is a perspective drawing illustrating the manner in which an individual key of the keyboard generates a coded signal in communicating with the input-output buffer.

In FIG. 11 a typical key of the keyboard 101 is shown to illustrate the manner in which a coded output is obtained upon the depressing of a key. The key button is attached to the end of the lever 209. When this lever is depressed, the interposer 211 is forced down between selected ones of the code bails 213, 215, and 217. These code bails are merely given by way of illustration. Actually, an 8-bit output code is used for the keyboard so that eight different code bails are required: one for each bit. The code bails are used for the entry of data, macroinstructions and microinstructions. The same code bails are employed to alter the microstorage area in the main memory to adapt the computer to carry out a different logical process. When a key is depressed, certain of the code bails are selected by the projections 219 and 221 that extend from the bottom of the interposer for that key. After the key has been depressed, the interposer 211 moves forward, pushing the code bails with the side of its bottom projections.

Each code bail rests in a slot of an elongated bellcrank 223 so that the bellcrank is pivoted whenever the code bail is moved forward. When the bellcrank pivots, it passes between the ferromagnetic core 225 and the permanent magnet 227.

A switching winding 229 on the ferromagnetic core 225 is able to switch the core from one state to the other whenever the bellcrank 223, which acts as a shield or shunt, is between the permanent magnet 227 and the core 225. When the bellcrank 223 is positioned at some other location not between the permanent magnet 227 and the core 225, the core is saturated and inhibited from switching by the field of the permanent magnet. Whenever the ferromagnetic core is not inhibited, the switching action causes a voltage to be generated in its output winding and delivered to the computer indicating a binary ONE.

The interposer 211 will select code bails to move forward for each of the bits of the 8-bit character that should be binary ONE's to represent the character selected by depressing the key in the keyboard. This device is described in greater detail in the patent application of Flavius A. Mathamel, Ser. No. 433,359, filed Feb. 17, 1965, now abandoned in favor of continuation application Ser. No. 816,643, filed Apr. 16, 1969, and assigned to the same assignee as this application.

Figure 12:
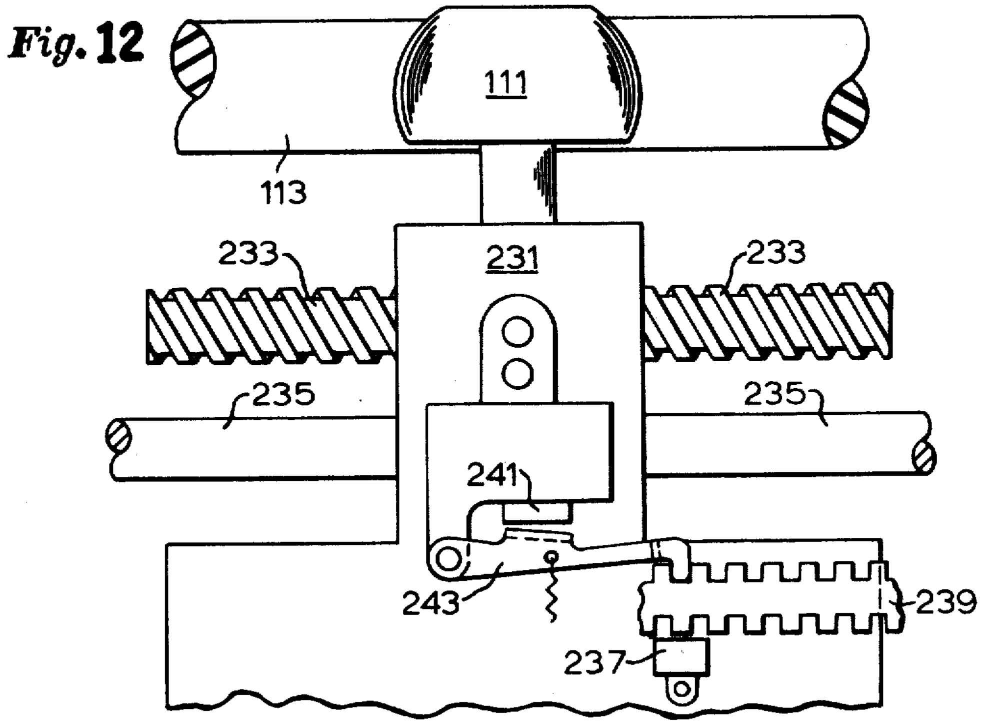
FIG. 12 is an elevational drawing illustrating the manner in which the printer operates in an embodiment of this invention.

In FIG. 12 a front view of an embodiment of the printer used in this computer is shown having a single element type head 111 which is indexed to the desired character and then impacted on the paper that is on the platen 113 through an ink ribbon. The print head 111 is mounted upon a carrier 231 which is driven in a direction parallel to the platen 113 to its desired location by a screw 233. It is also slidably supported by the bar 235.

A magnetic transducer 237 functioning as a position detector is mounted on the carrier 231 and produces a signal each time the carrier moves one printing position. The signal is referenced to the teeth of a rack 239. The position of the carrier is recorded on a counter that counts the signals from the transducer 237. When the proper location for printing is reached, a comparator is activated by a comparison of the count from the transducer 237 and a number provided by the computer and causes a solenoid 241 to release a pawl 243. The pawl 243 engages the teeth of the rack 239, which is rigidly affixed to the frame of the computer, and causes the carrier 231 to stop so that a printing operation may be performed by the printing head 111. This printer is described in greater detail in the application of Shukla et al., entitled "Position Detector", Ser. No. 474,202, filed July 2, 1965, now U.S. Pat. No. 3,434,581, and assigned to the same assignee as this application.

Figure 13A:
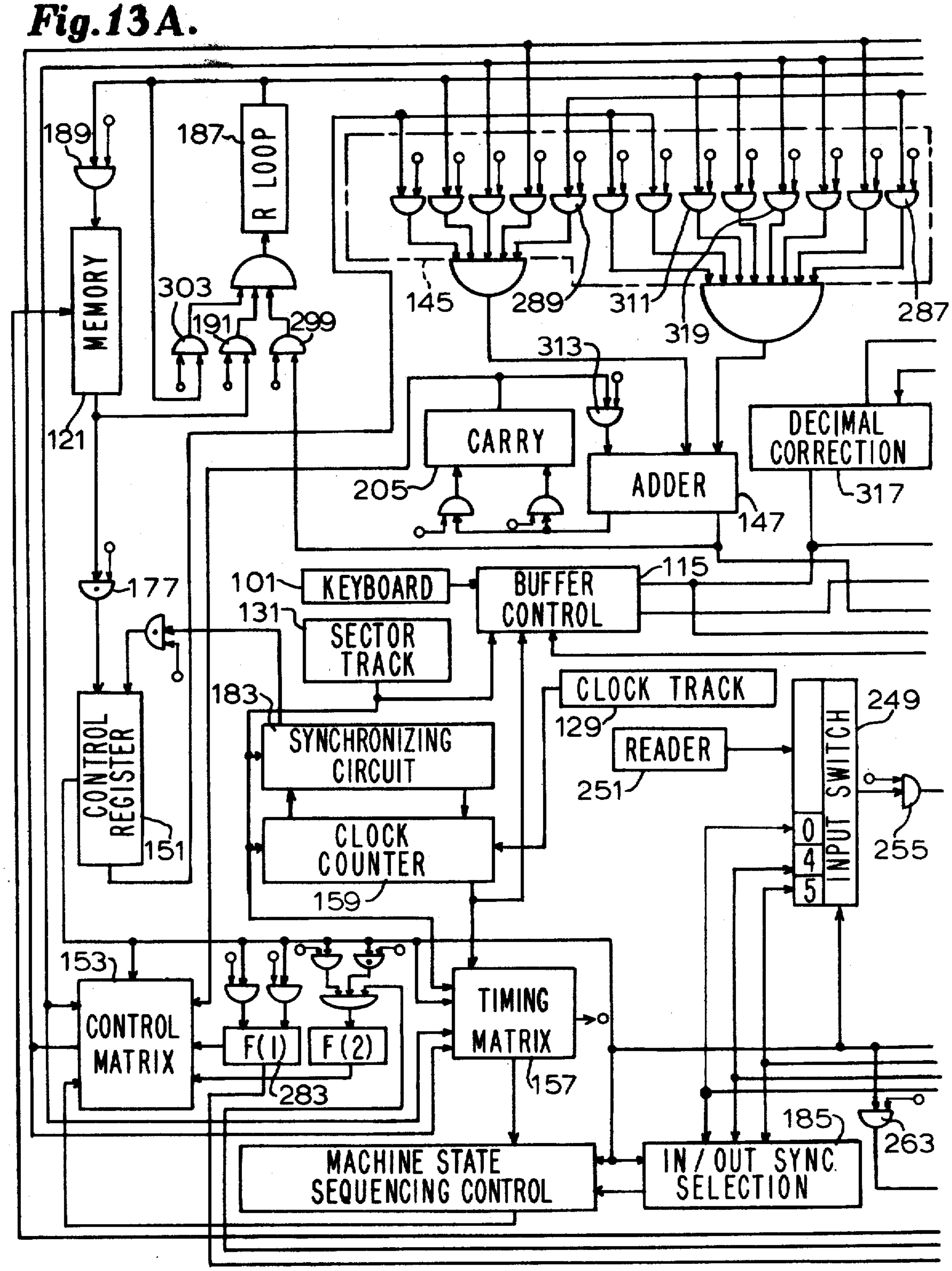
FIG. 13A and FIG. 13B together are block diagrams of the computer system illustrating the relationship between the various sections.
Figures 13, 13B:
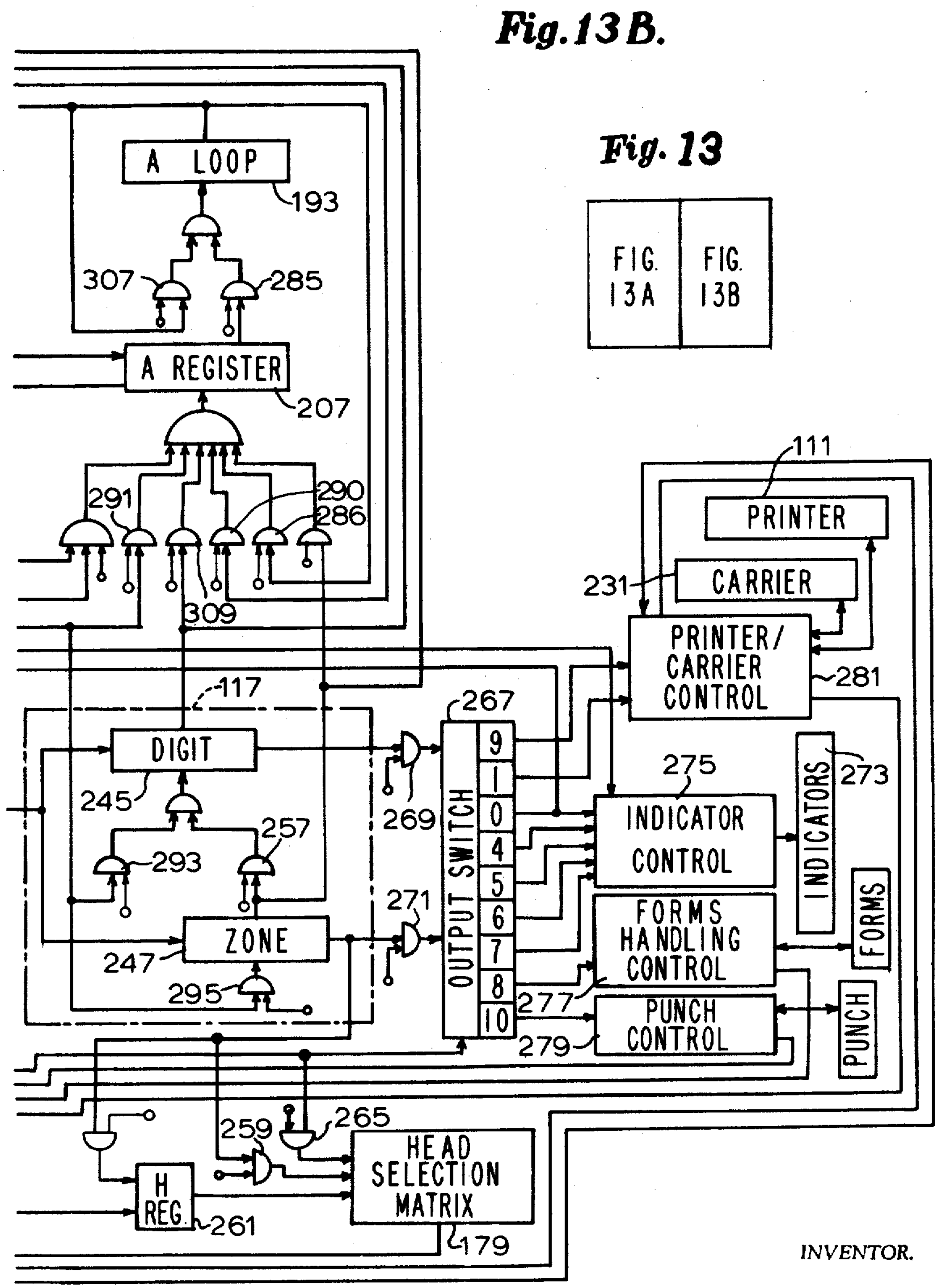
FIG. 13 is a plan view showing the relationship between FIG. 13A and FIG. 13B.

FIGS. 13A and 13B provide a composite block diagram of the computer system showing the main memory 121 connected to the R recirculation loop 187, the control register (microinstruction register) 151, the control matrix 153, the adder 147, the A recirculation loop 193, and the timing matrix 157. The gating circuitry, synchronizing circuitry, and input-output equipment are also shown in this FIG.

As in FIG. 10 the input-output buffer 117 is shown in dotted outline in FIG. 13B as having two 4-bit registers 245 and 247. Data and instructions are entered into the buffer 117 through the input switch 249 (FIG. 13A) either from the keyboard, through the keyboard buffer, or a punched card reader 251. Information is gated from the input switch 249 to the input-output buffer 117 through the gate 255.

The four most significant bits in the input-output buffer 117 are in the Zone register 247 and the four least significant bits are in the Digit register 245. The Zone register and the Digit register are connected through the gate 257.

Three out of the four most significant bits in the Zone register 247 are connected to the head selection matrix through a gate 259. These bits help select the read head or write head that is to be activated. The active microtrack is selected by information from the H register 261. Two bits from the control register 151 and three bits from the Zone register 247 select the memory location for loading and unloading the R loop 187.

The input-output buffer 117 also supplies information to the output switch 267 through the gate 269 from the Digit register 245 and through the gate 271 from the Zone register 247. The output switch 267 also receives information from the control register 151 (FIG. 13A) which register controls the flow of information entered from the input-output buffer to the output circuits from the output switch. The output switch controls the indicator lights 273 which are located in the keyboard panel to indicate certain selected keys. The lights may be controlled by indicator control circuitry 275 of the type described in the patent application to Mathamel, Ser. No. 438,293, filed Mar. 9, 1965, now U.S. Pat. No. 3,373,419, for "Multimode Memory and Display System" and assigned to the same assignee as this application. The output switch also controls the form handling control 277 and the punch control 279.

The printer carrier control 281 receives data from the input-output switch to control the single element printer 111 on the computer. It also receives signals from the flip-flop 283 (FIG. 13A) which indicates to the printer carrier control when the printer element 111 is three positions away from its stopping position. It counts from this position to the stop position and controls the speed so that the carrier for the printer element is slowed down and then finally stopped at the correct location. This mechanism is described in the aforementioned patent to Shukla et al. entitled "Position Detector." The printer carrier control also sends information to the input-output synchronization selection circuit 185 (FIG. 13A) and to the input switch 249 indicating the number of positions that the carrier has moved.

The 4-bit A register 207 (FIG. 13B), and the A loop 193 associated with the magnetic disc, form a four-word long recirculation loop. Data may flow from the 4-bit A register 207 to the A loop 193 through the gate 285 and from the A loop 193 back to the A register 207 through the gate 286. Gate 286 is normally open unless an input gate, for example 291, 309 or 290, is opened. When an input gate is opened, gate 286 is closed and remains closed until the input gate is closed at which time gate 286 reopens to again permit recirculation in the A loop.

Information may be read into the one-word R loop 187 from the memory 121 through the gate 191, from the adder through the gate 299, or from its own output through the gate 303. Information may be read into the memory 121 from the R recirculation loop through the gate 189. Gate 303 in the R loop operates in essentially the same manner as gate 286 in the A loop. The gate closes upon the opening of any other input gate to the R loop to prevent mixing of the recirculating and incoming information.

The R loop 187 is also used to communicate between the memory 121 and the A recirculation loop 193. There are two paths from the memory 121 through the R loop to the A loop. A first path is available for transferring words directly to the A loop through the adder 147 for addition and subtraction. A second path is available for the transfer of digits or characters from the R loop to the input-output register 117 to modify the contents of the A loop by another microinstruction.

Arithmetic and logical operations are generally carried out in the A recirculation with the R recirculation being used to synchronize the flow of data and instructions to and from the memory. Some arithmetic and logic functions are carried out in the R loop when a fast access time is desired. The advantage of speed of access must be set off against the disadvantage that the R loop must be used to control access to main memory. The sector track 131 and the clock track 129, which are located on the magnetic disc that contains the memory 121, provide signals to the clock counter 159 and to the timing matrix 157.

The synchronizing circuit 183 recognizes a starting signal code on the sector track of the main memory 121. On starting or on an error, it clears the clock counter 159. The clock counter 159 then receives pulses from the clock track 129 and the sector track 131. It provides output signals to the timing matrix 157 to control the time at which the head selection matrix 179 (FIG. 13B) causes information to be read from the magnetic disc and also the time at which gates are to be open by the control matrix 153 (FIG. 13A). A special "power on" microprogram inserts the address into the H register 261 (FIG. 13B) of the starting microtrack. The individual microinstructions are then read into the control register 151 where they are used to execute the macroinstructions. Individual microprograms can be used to perform each macroinstruction. A few microinstructions will be illustrated with reference to FIG. 13 to illustrate the manner in which they control the computer to achieve its flexibility and economy of operation.

A selected word in the A recirculation loop can be shifted right four bits under microprogram control. This is done by opening the gate 307 so that the selected word is read from the output of the A loop 193 back into its input without passing through the A register 207. When 307 is opened, 285 is automatically closed. When 307 is closed, 285 is opened, preventing further shift or loss of information. The A register 207 continues to shift when gate 307 is opened causing zeros to be loaded into the register. The operation has the effect of shortening the A recirculation loop by four bits. The microinstruction in the control register 151 ends four bits before the end of word time, permitting the four zeros from the A register to be entered into the most significant digit of the word and thus completing the shift right operation.

The A recirculation loop can be shifted left four bits by opening gates 293, 289, and 309. These gates are open during a full word time. This operation adds the digit register 245 to the A recirculation loop path by lengthening it by four bits. Lengthening the A recirculation loop causes the information that it contains to precess to the left or away from the least significant digit. If the control levels remain during an entire word, then at the end of the operation the Digit register contains what had been the most significant four bits of the selected word in the A loop, while the least significant four bits of the selected word contain whatever had been in the Digit register 245 prior to the execution of this shift microinstruction and the remaining 15 4-bit digits in the A recirculation loop are shifted one digit to the left.

A word stored in the R recirculation loop 187 can be exchanged for a word in the a recirculation loop 193 by opening gate 289, gate 299, and gate 290. In this way a selected word in the A loop can be transferred through the adder 147 into the R loop and the word in the R loop can be transferred directly into the A loop.

The contents of the R loop 187 can be added to a selected word in the A recirculation loop by opening gates 289, 311, 291, and 313 at the appropriate time. By opening gate 313 the carry flip-flop 205 is connected into the arithmetic unit. The decimal correction input 317 is connected to the A register 207 to directly modify the data in the register.

The contents of any 4-bit digit in the A recirculation loop may be added to the contents of the Digit register 245 by opening the gates 289, 319, 293, and 291 at the appropriate digit time. At the end of the operation the contents of the selected four bits in the A recirculation loop and the contents of the Digit register 245 are identical and equal to the hexadecimal sum of the two 4-bit characters. The carry flip-flop will be set if the sum is greater than 15.

When data is to be changed in the main memory 121, the input-output buffer 117 is loaded with the 8-bit address of the selected word in the appropriate block of the main memory. The number field of this microinstruction designates which block of eight tracks is to be accessed. Five bits of the input-output buffer complete the timing of the instruction which selects one of 32 words on the selected track. The selected word is then read into this location from the R recirculation loop 187, by opening gate 189 at the proper time.

When a part number or a customer number is typed from the keyboard into the input-output buffer as part of a program, such as a program for filling out billing records, a macroprogram is selected to fill in the appropriate data stored in the main memory that corresponds to the part number or customer number onto the billing and to perform whatever calculations are necessary for subsequently introduced data, such as for prices of the items.

The sequencing of the macroinstructions can be handled in more than one way in a microprogrammed computer. Since the macroinstructions are under the control of the microprogram, different formats may be used as, for example, self-addressed instructions or the use of a program counter to control the sequence.

In this embodiment, a program counter is used. This program counter is a software counter located in the A recirculation loop. It is the last eight bits of the third word of the A recirculation loop which, as mentioned above, is four words in length. The program counter is incremented by setting the carry control 205 and adding the carry to the count in the adder 147. This is done under microprogram control each time a new macroinstruction word is to be executed.

A syllable counter is used to record the particular one of the four instructions that are present in each macroinstruction word which is being currently executed. This syllable counter consists of four bits in the least significant (last) location of the first word in the A recirculation loop. The syllable counter is located separately from the program counter in order to improve the ability of the computer to access data in the A recirculation loop. The syllable counter is located so as to be readily available when the FETCH microprogram is executed. The counter is reset before that time and begins counting each instruction of the newly accessed macroinstruction word as it is executed.

The macroinstructions word which is currently being executed is located in a software program register which is stored in memory. Since there are four microinstructions in each word, the main memory is normally accessed once for every four instructions and the four instructions are placed in the program register. This improves the speed of operation of the macroprogram sequencing.

It can be seen that the computer described contains very few hardware parts. It is reliable and economical because of its use of software to perform the function normally performed by hardware. The particular arrangement of the hardware and software cooperate to make an especially effective keyboard-driven computer for use in business applications. The use of microprograms and stored logic, including stored program syllable counters for the microinstructions, greatly simplifies the sequence of the stored program. The use of microinstructions enables the format of the computer to be easily changed for different applications.

While a particular embodiment of the invention has been shown, it will be understood, of course, that it is not desired that the invention be limited thereto since modifications may be made, and it is, therefore, contemplated by the appended claims to cover any such modifications as fall within the true spirit and scope of the invention.

We claim:

1. A serial step stored program digital computer comprising:
input means for the entry of data, macroinstructions and microinstructions,
storage means including:
a first portion of said storage means for the storage of data and macroinstructions, and
a second portion of said storage means for the storage of microinstructions:
means selectively coupling said input means to said storage means for writing data and macroinstructions into the first portion of said storage means and for reading the same therefrom, and means selectively coupling said input means to said storage means for writing microinstructions into the second portion of the storage means and for reading the same therefrom,
microprogram control means including:
means for selectively reading microinstructions from said second portion of said storage means in a predetermined sequence and for decoding the same, and
means for modifying one or more of such read and decoded microinstructions according to macroinstructions to be implemented in processing the data in the first portion of said storage means;
data manipulation means including:
operating means under the control of the microinstructions derived by the microprogram control means from the storage means and as such microinstructions may be modified thereby for operating on the stored data, and
output means operatively associated with said operating means for displaying the result of the operation on the stored data.

2. A digital computer as set forth in claim 1 wherein said input means includes means for entering a new set of microinstructions to alter the microinstructions stored in said second portion of said storage means to adapt the computer to perform a varied operation on data stored in the first portion of said storage means.

3. A digital computer as set forth in claim 1 wherein said storage means comprising a magnetic disc which is divided into data and macrostorage tracks, microstorage tracks, timing tracks and recirculation tracks operatively associated with and usable by said data manipulation means.

4. A digital computer as set forth in claim 1 additionally including means for expanding the second portion of said storage means into the first portion of said storage means under microprogram control.

5. A digital computer as set forth in claim 1 wherein said data manipulation means includes:
a first recirculation means for synchronizing read and write operations with said storage means,
a second recirculation means including stored logic and means for storing and processing each macroinstruction stored in said first portion of said storage means, means for applying a decimal correction to said second recirculation means, a second register connected to said input means, an adder coupled to said second recirculation means for processing data in said manipulation means.

6. A digital computer as set forth in claim 5 wherein said data manipulation means additionally includes:

a macroinstruction program counter in said second recirculation means, and means for selectively incrementing the count of said program counter under microprogram control each time one macroinstruction is executed by said microinstructions.

7. A digital computer as set forth in claim 6 wherein said data manipulation means additionally includes:

macroprogram register means in said second recirculation means for storing a sequence of the macroinstructions to be executed, and means for sequentially selecting one or more portions of said sequence of macroinstructions under the control of said macroinstruction program counter.

8. A digital computer as set forth in claim 6 wherein said data manipulation means additionally includes:

a macroinstruction syllable counter in said second recirculation means; said macroinstruction syllable counter adapted to be incremented under microinstruction control each time one syllable of one macroinstruction is executed; said macroinstruction program counter being incremented by one each time said syllable counter is reset to zero.

9. A digital computer as set forth in claim 1 wherein said microprogram control means comprises:

microinstruction register means for temporarily storing a selected microinstruction, control means for selecting and enabling logic gates within said data manipulation means as directed by the microinstruction in said microinstruction register, and timing means for determining the period during which the selected logic gates in said data manipulation means are enabled by said control means.

10. A digital computer as set forth in claim 3 wherein said timing tracks in said storage means comprise a sector track portion for storing addresses of groups of information and a clock pulse track portion for storing a pulse for each bit on a data track, said clock track portion being used to count characters in the addresses on said sector track; at least one address on said sector track containing a reference code to clear address-timing counters when said computer is started or immediately after an error is detected by said computer.

11. A digital computer in which serial step programmable instructions for manipulating data are accomplished by sequentially calling forth and executing a string of microinstructions for each such programmed instruction at least a portion of said microinstructions having been previously recorded, said computer comprising:

divided input register means including a digit portion for storing a least significant portion of a character and a zone portion for storing a most significant portion of a character, said character comprising a predetermined number of bits, an arithmetic unit, cyclic memory means including a first addressable main memory section for storing object data and macroprogram instructions, and a second addressable memory section for storing microprogram instructions, recirculating register means operatively associated with said input means and said cyclic memory means for synchronizing read-write operations therebetween and operatively associated with said arithmetic unit for selectively shifting data relative to a predetermined reference during arithmetic operations, instruction register means for sequentially storing and implementing said microinstructions which are withdrawn from said second addressable memory, control matrix means for generating logical control signals in response to the contents of said instruction register means, and gating means responsive to said matrix means for selectively interchanging information between said individual portions of said input register means and said recirculating register means.

12. The computer defined in claim 11 additionally including:

an information register, and logical gating means for selectively coupling said information register to said recirculation register means to vary the length of said recirculation register means.

13. The computer defined in claim 11 additionally including:

bistable control means for selectively permitting the programmable storage of microprogram instructions in said main memory section of said cyclic memory means, and means for modifying the address of the next microinstruction as determined by said microinstruction register when said bistable control means is in a predetermined state.

14. The computer defined in claim 11 wherein:

said cyclic memory means comprises a rotatably supported multitrack magnetic disc including a plurality of the read-write heads for selectively reading and writing data in said main memory section and a plurality of read heads for selectively reading information previously stored in said second memory section, and additionally including, track pointer register means for selectively addressing and activating ones of said heads for accomplishing information transfer to and from said magnetic disc, and gating means for selectively transferring bits of a character from predetermined positions of said instruction register means and said individual portions of said input register means to said track pointer register means.

15. The computer defined in claim 14 wherein:

said multitrack magnetic disc additionally includes at least one timing track for storing a pattern of timing pulses, and wherein said instruction register means includes an instruction portion and a next instruction address portion, and additionally including clock counter means responsive to said pattern of timing pulses for generating a cyclic timing pulse pattern, gating means for reading information from said microinstruction portion of said disc into said instruction register means, and timing matrix means responsive to said clock counter means and to said control matrix means for activating said gating means to serially read microinstruction data into said microinstruction register in accordance with the contents of said address portion of said instruction register means.

16. A stored program computer in which programmable instructions for manipulating object data are accomplished by calling forth and executing a string of at least one microinstruction for each such programmed instruction, said computer comprising:

an arithmetic unit, a multisection input register including a first section for storing a first portion of a character and a second section for storing a second portion of a character, rotatable magnetic memory means including a read-write addressable main memory section for storing object data and macroprogram instructions, an addressable read memory section for storing microprogram instructions and a timing track section for storing a pattern of timing pulses, program register means for storing macroprogram instructions withdrawn from said main memory section, microprogram register means for storing microprogram instructions withdrawn from said read memory section, said microprogram register means including an instruction section and a next instruction address section, a plurality of recirculation storage register means for temporarily storing program and object data words, means for selectively modifying the effective storage length of at least one of said recirculation storage register means, gating means for selectively interchanging the contents of individual ones of said sections of said input register means with the contents of a portion of said recirculation register means, transfer gating means for transferring the contents of ones of said sections of said input register means to said microprogram register means, means for selectively coupling an output of said section of said input register means and an output of said recirculation means to the input of said arithmetic unit, and means for selectively coupling the output of said arithmetic unit to an input of said sections of said input register means and to an input of said recirculation means.

17. The computer defined in claim 16 wherein said program-register means simultaneously stores a plurality of sequential program instruction words and additionally including:

program counter means for controlling the sequential execution of individual ones of said plurality of program instructions stored in said program register means in accordance with the content of said program counter means, and means including carry circuitry means associated with said arithmetic unit for incrementing said program counter upon the completion of predetermined program instruction steps.

18. A digital computer as set forth in claim 3 wherein said timing tracks in said storage means include a sector track containing addresses of groups of stored information and a clock pulse track for generating a pulse for each bit on a data track, and means for counting the characters that occur in the addresses on said sector tracks.

19. A serial step stored program digital computer comprising:

input means for the entry of data, macroinstructions and microinstructions, storage means including:

a first portion of said storage means for the storage of data and macroinstructions, and a second portion of said storage means for the storage of microinstructions, the format of each such microinstruction including an operation portion and an address portion designating the address of the next succeeding microinstruction occuring in a predetermined normal string of such microinstructions;

means selectively coupling said input means to said storage means for writing data and macroinstructions into the first portion of said storage means and for reading the same therefrom, and means selectively coupling said input means to said storage means for writing microinstructions into the second portion of the storage means and for reading the same therefrom;

microprogram control means including:

means for selectively reading microinstructions from said second portion of said storage means in a sequential order determined by the address portions thereof and for decoding the same, and means for modifying one of said format portions of a selected microinstruction read from the storage means; and data manipulation means including:

operating means under the control of the microinstructions derived by the microprogram control means from the storage means and subject to modification thereby for operating on the stored data, and output means operatively associated with said operating means for displaying the result of the operation on the stored data.

20. A digital computer as set forth in claim 19 wherein said format modifying means modifies the address portion of a selected microinstruction read from the storage means for altering the string of which the microinstruction is a part.

21. A digital computer as set forth in claim 19 wherein said format modifying means modifies the operation portion of a selected microinstruction read from the storage means for changing its operation.

22. A digital computer in which programmable instructions for manipulating data are accomplished by sequentially calling forth and executing a string of microinstructions including, in combination:

input means including a digit portion for storing a lesser significant portion of a character and a zone portion for storing a more significant portion of a character, memory means including separate sections for storing data, macroinstructions and microinstructions and further including means for performing write-in and readout operations with respect to the storage areas of said memory sections, an instruction register for sequentially storing and implementing the microinstructions withdrawn from the microinstruction storage section of said memory means, control means for generating control signals in response to the contents of said instruction register, data manipulation means including a recirculation path for performing arithmetic and logic operations and a second recircula tion path for synchronizing the flow of data and instructions to and from the memory means, and gating means responsive to the control signals generated by said control means for selectively interchanging information between said individual portions of said input means and the recirculation paths of said data manipulation means.

23. A digital computer in which programmable instructions for manipulating data are accomplished by sequentially calling forth and executing a string of microinstructions including, in combination:

input register means for the entry of data, macroinstructions and microinstructions, rotatable memory means coupled to said input register means and having separate sections for storing data, macroinstructions and microinstructions and further including means for performing write-in and readout operations with respect to the storage areas of said memory sections, a macroinstructions register for storing the macroprograms withdrawing from the macrostorage section of said memory means, a microinstruction register for storing the microinstructions withdrawn from the microinstructions storage section of said memory means, data manipulation means including recirculation path means capable of being shifted "right" and "left" for performing arithmetic and logic operations and further including logic gates for the control of such operations, control means for generating control signals in response to the contents of said macroinstruction and microinstruction registers for selecting and enabling the logic gates of said data manipulation means, and timing means for determining the period during which the selected logic gates in the data manipulation means are enabled by said control means.

PO-1050
(5/69)

UNITED STATES PATENT OFFICE
CERTIFICATE OF CORRECTION

Patent No. 3,579,192 Dated June 8, 1971

Inventor(s) David Rasche et al

It is certified that error appears in the above-identified patent and that said Letters Patent are hereby corrected as shown below:

Col. 1, lines 38 & 39, should be --keyboard-controlled--.

Col. 3, line 72, should be --routine than that--.

Col. 4, line 23, should be --or back into--.

Col. 6, line 11, should be --these seven bits--.

Col. 13, line 3, should be --a register connected--.

Signed and sealed this 21st day of September 1971.

(SEAL)
Attest:

EDWARD M.FLETCHER,JR.
Attesting Officer

ROBERT GOTTSCHALK
Acting Commissioner of Patents